June 2, 1970 C. T. BICKNER 3,515,317

APPARATUS FOR MAKING ORNAMENTAL BOWS

Filed Aug. 5, 1968 7 Sheets-Sheet 1

INVENTOR.
CLARENCE T. BICKNER

BY Lippincott, Gregg,
Hendrickson & Stidham

ATTORNEYS

June 2, 1970  C. T. BICKNER  3,515,317
APPARATUS FOR MAKING ORNAMENTAL BOWS
Filed Aug. 5, 1968  7 Sheets-Sheet 2
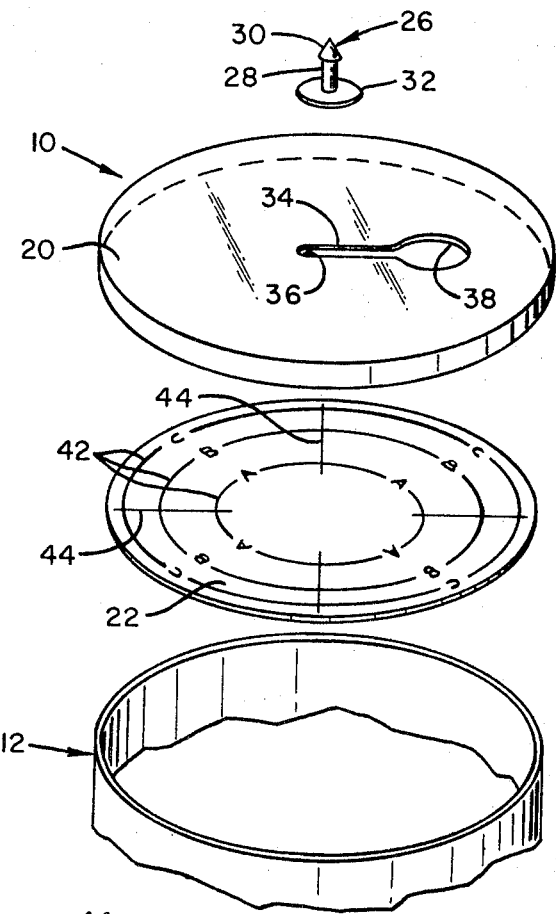
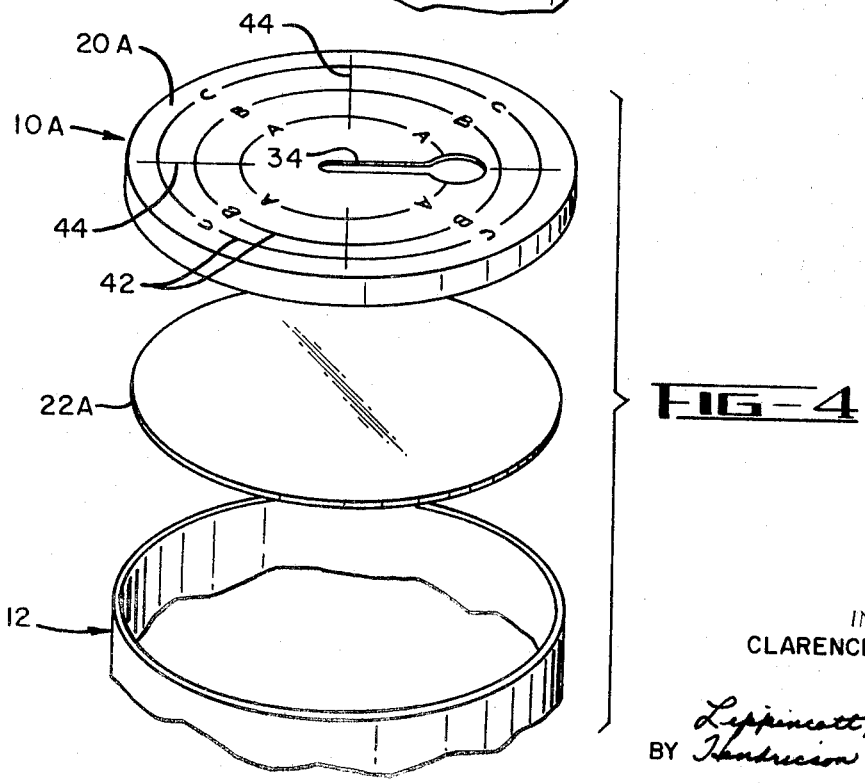
INVENTOR.
CLARENCE T. BICKNER
BY
ATTORNEYS June 2, 1970  C. T. BICKNER  3,515,317
APPARATUS FOR MAKING ORNAMENTAL BOWS
Filed Aug. 5, 1968  7 Sheets-Sheet 4
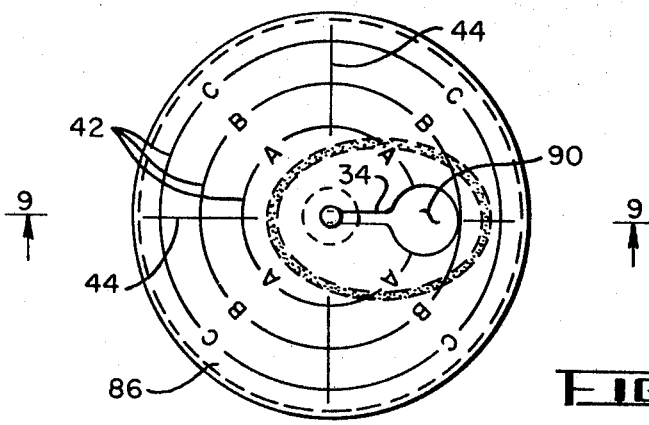
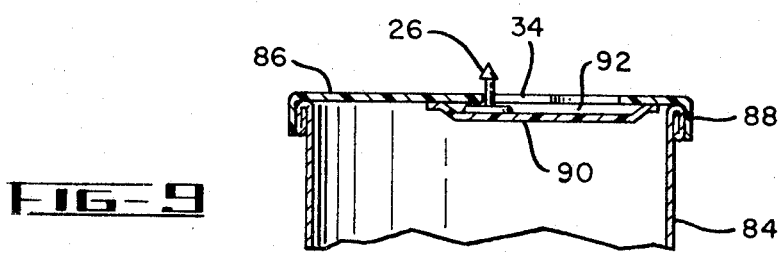
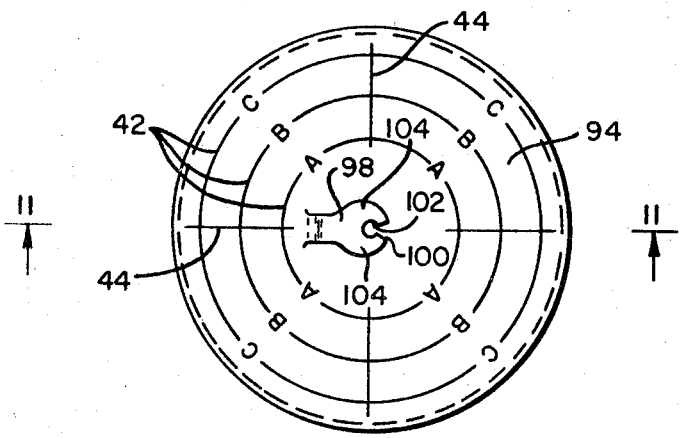
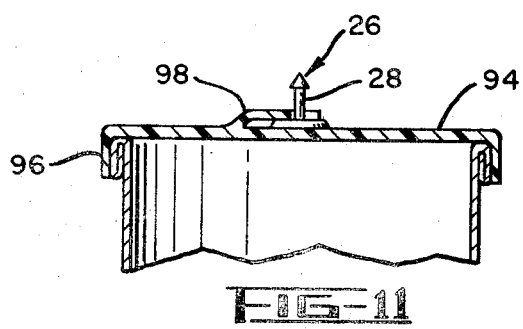
INVENTOR.
CLARENCE T. BICKNER
BY Lippincott, Gregg
Henderson & Stidham
ATTORNEYS June 2, 1970   C. T. BICKNER   3,515,317
APPARATUS FOR MAKING ORNAMENTAL BOWS
Filed Aug. 5, 1968   7 Sheets-Sheet 5

INVENTOR.
CLARENCE T. BICKNER

BY *Lippincott, Gregg,*
*Henderson & Stellam*
ATTORNEYS

June 2, 1970     C. T. BICKNER     3,515,317

APPARATUS FOR MAKING ORNAMENTAL BOWS

Filed Aug. 5, 1968     7 Sheets-Sheet 6

INVENTOR.
CLARENCE T. BICKNER

BY *Lippincott, Gregg,
Henderson & Stellman*

ATTORNEYS

INVENTOR.
CLARENCE T. BICKNER

ATTORNEYS

United States Patent Office 3,515,317
Patented June 2, 1970

3,515,317
APPARATUS FOR MAKING ORNAMENTAL BOWS
Clarence T. Bickner, 957 Manor Road,
El Sobrante, Calif. 94803
Filed Aug. 5, 1968, Ser. No. 750,048
Int. Cl. A41h 43/00
U.S. Cl. 223—46　　　　　　　　　　　　　　6 Claims

ABSTRACT OF THE DISCLOSURE

A bow making device is provided which utilizes a can to which a plastic cover is removably attached, the lid of the can being provided with one or more guide circles for use in making a bow, the plastic cover being formed with means to hold a bow pin.

---

This invention relates to apparatus for making ornamental bows, and more particularly to a combination bow making device and lid for a container.

Numerous bow making devices for home use, as distinguished from commercial use, are well known. However, many such devices are expensive, difficult to use, capable of making only a limited number of sizes, shapes and designs of bow, and/or have no provision for the convenient storage of bow making supplies such as scissors, ribbon, bow pins, adhesive, labels and the like.

An object of this invention is the provision of a novel bow making apparatus which avoids the shortcomings of prior art bow making devices.

An object of this invention is the provision of an economical bow making apparatus which serves also as a removable container cover for a container which may be used for the storage of bow making supplies.

An object of this invention is the provision of bow making apparatus by use of which a large number of sizes, shapes and designs of ornamental bows may be produced.

The bow making apparatus of this invention comprises a lid for a container, such as a can. Bow pin holding means are centrally located on the lid to detachably hold a bow pin. The bow pin holding means may comprise an elongated slot in the lid of a width to permit insertion and sliding movement of the spike of a bow pin but narrower than the base of a bow pin. Alternatively, a small diameter central aperture with a plurality of slots extending therefrom may be formed in the lid to receive the bow pin. The lid may be applied to the closed end of a can in which case the base of the bow pin fits in a pocket formed between the lid and can end. If the bow maker is to be attached to the open end of a can, the bow pin holding means may comprise a lid which includes first and second plates held together adjacent the periphery of at least one of said plates. An elongated slot for reception of the bow pin is formed in the uppermost plate and extends to the center of the cap. With this arrangement the bow pin base is positioned in a pocket formed between said first and second lid plates. Alternatively, suitable resilient fingers on the surface of the lid may be provided for gripping the bow pin base and supporting the bow pin in an upright position. Ribbon wound on tubular cores may be stored in the container to which the lid is applied, and other ribbon making supplies such as scissors, bow pins, and the like, may be stored inside the tubular cores within the container.

The invention will be better understood from the following description when considered in view of the accompanying drawings. Several embodiments of the invention are illustrated in the drawings, wherein like reference characters refer to the same parts in the several views:

FIG. 3 is a fragmentary exploded perspective view of the bow making apparatus shown in FIGS. 1 and 2 but without the showing of a bow;

FIG. 4 is a view which is similar to that of FIG. 3 but showing a lid with guide circles formed on the upper surface thereof, rather than on an underlying plate;

FIG. 8 is a plan view of another modified form of this invention;

FIG. 9 is a fragmentary cross-sectional view taken on line 9—9 of FIG. 8;

FIG. 10 is a plan view of yet another modified form of this invention;

FIG. 11 is a fragmentary cross-sectional view taken on line 11—11 of FIG. 10;

Figure 1:
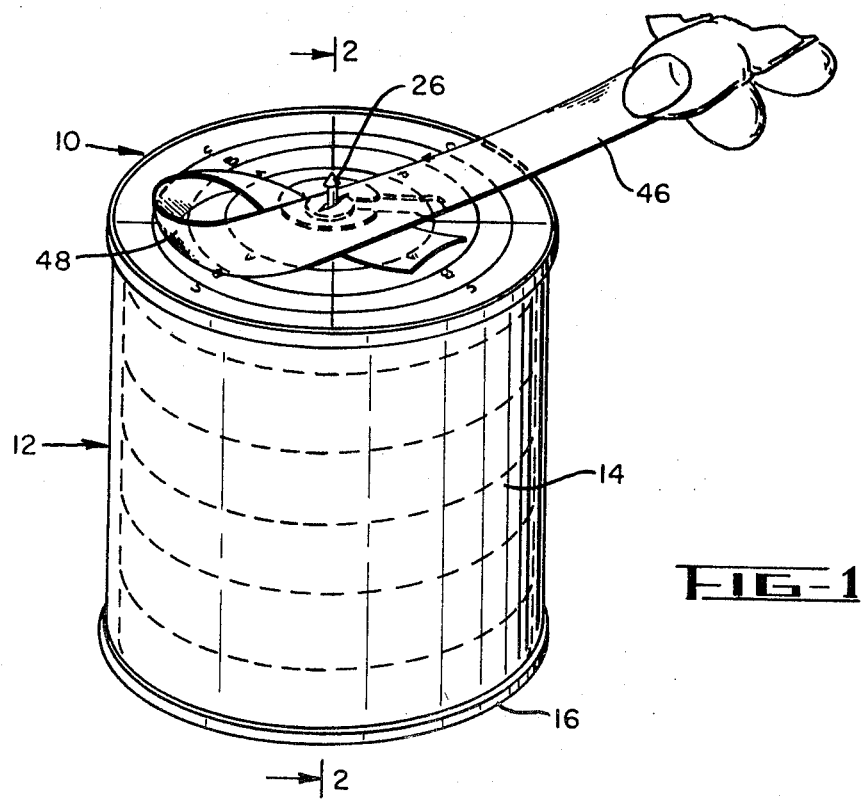
FIG. 1 is a perspective view of a novel bow making apparatus embodying this invention, and showing a step in forming a bow with the apparatus.
Figure 2:
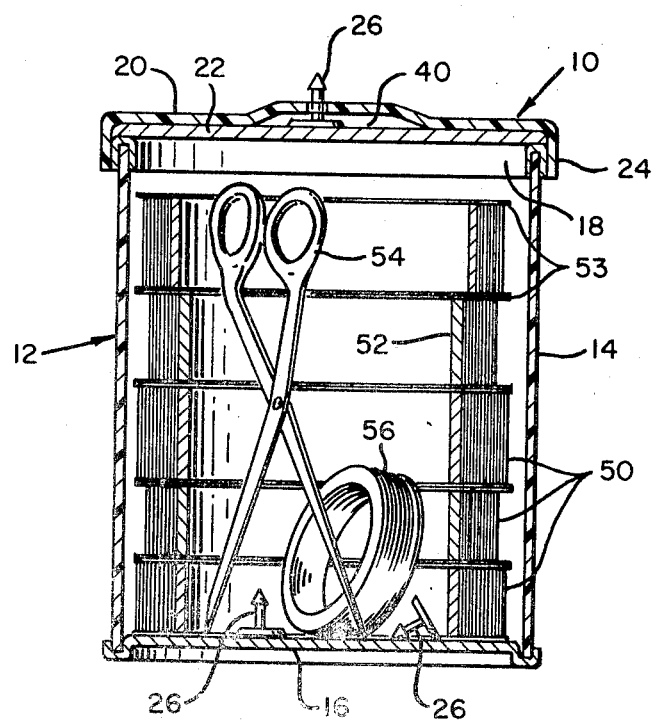
FIG. 2 is a cross-sectional view of the bow making apparatus taken on line 2—2 of FIG. 1, but without the showing of a bow being formed thereon.

Reference is first made to FIGS. 1 and 2 wherein a novel bow making apparatus incorporating this invention is shown comprising a lid 10 removably attached to a container 12 of conventional design. The illustrated container comprises a can having a cylindrical-shaped can body 14 closed at one end by a can end 16. The container may be made of metal, plastic, cardboard, or the like. In the illustrated arrangement the can comprises a can body 14 of transparent plastic material and a can end 16 of metal crimped to the lower end of the body. A rim or annular band 18 is formed or secured as by crimping to the upper free edge of the can body to reinforce the same thereat. Instead of the illustrated metallic band 18, the container may comprise a plastic body having a molded bead or rim at the free edge thereof.

The can lid 10 in the embodiment of the invention shown in FIGS. 1–3 comprises outer and inner plates 20 and 22. The outer plate 20 is formed with an axial flange 24 adapted to extend over the container body for removable attachment of the lid to the container. The inner plate 22 of the lid rests upon the rim 18 and is held thereagainst by the outer plate 20. If desired, the inner and outer plates 22 and 20 of the lid 10 may be secured together adjacent the periphery thereof.

The lid 10 is provided with bow pin holding means for detachably holding a bow pin 26 at a central location thereon. Bow pins are well known, and as best seen in FIG. 3, comprise an elongated shank or spike 28 formed with a pointed barb 30 at one end and a radially extending flange or base 32 at the other end. The bow pin holding means comprises an elongated slot 34 in the outer plate 20 of the lid, one end 36 of which slot terminates adjacent the center of the lid. In the arrangement shown in FIGS. 1–3, the slot terminates at the other end thereof in an elongated circular shaped section 38 having a diameter slightly greater than the diameter of the flange 32 of the bow pin. The bow pin is secured to the lid by simply extending the flange 32 thereof through the enlarged diameter end 38 of the slot and then sliding the pin to the other end of the slot into the position illustrated in FIGS. 1 and 2. A pocket 40 as seen in FIG. 2 is formed between the plates 20 and 22 for the reception of the flange 32 on the bow pin. The outer plate 20 and/or inner plate 22 of the lid 10 are sufficiently flexible to permit the formation of the pocket 40 therebetween when the bow pin is inserted in the slot 34. The bow pin is rigidly, yet detachably supported in an upright position at the center of the lid when the base 32 of the pin is positioned in the pocket 40.

In the embodiment of the invention illustrated in FIGS. 1–3 the outer plate 20 of the lid 10 is made of transparent material for viewing of the inner plate 22 therethrough. As seen in FIG. 3, the inner plate may be formed with concentric guide circles 42 and generally radially extending guide lines 44. To facilitate identification of the annular rings 42 during use of the bow maker, they may be labeled as by the use of letters A through C, as shown.

With a bow pin 26 detachably secured to the lid the apparatus is in condition for forming an ornamental bow. Briefly, as illustrated in FIG. 1, a bow is formed by impaling one end of a ribbon 40 on the bow pin 26, forming a loop 48 with a length of ribbon extending from the impaled end of the ribbon, and securing such loop against the lid by impaling the ribbon on the pin. The can 12 with attached lid then is rotated to a position convenient for similarly forming the next loop (not shown) of the bow, and the next loop is formed in a manner similar to the formation of the first loop. The formation of loops is continued until the desired bow has been formed. The concentric guide rings 42, and the edge of the lid function as a guide for making loops of uniform size. Obviously, loops and consequently ornamental bows of different size may be formed. Each guide circle 42 when used separately for measuring ribbon will result in the making of a different size bow. Also, a single bow with different sized loops may be formed. A more detailed description of the bow forming method is contained in my co-pending application Ser. No. 505,589, filed Oct. 21, 1965 and entitled "Apparatus and Method for Making Ornamental Bows" now U.S. Pat. No. 3,411,677.

With the bow pin spike 28 in close proximity to the outer surface of the lid, the loops engage the same and tend to remain where formed thereon because of the natural resiliency of the ribbon and the placing of the loops in compression between the barb 30 and the lid. With this arrangement there is no need for pegs or posts surrounding the bow pin upon which to form the loops.

The container 12 also may be used for the storage of bow making supplies. For example, a plurality of ribbon rolls 50 may be stored in the can. The ribbon is wound upon conventional cores 52 of tubular cylindrical shape. The ribbon rolls are formed without end members or are provided with end members 53 having large central openings therein whereby a large storage area is formed within the stacked cores 52 which inner area may be employed for the storage of additional bow making supplies such as additional bow pins 26 and a pair of scissors 54 for cutting the ribon to desired length. Additional supplies such as adhesive tape 56 for taping the completed ornamental bows to a support, and labels (not shown) for labelling the same, also may be stored inside the stacked cores. All of the apparatus necessary for making and using the ornamental bows is conveniently stored in the container. Furthermore, by making the can body 14 of transparent plastic material the colored ribbon rolls 50 are visible therethrough to provide an attractive package.

It will be apparent that changes and modifications may be made in the apparatus without departing from the spirit of the invention. For example, in FIG. 4 there is shown an apparatus similar to that shown in FIGS. 1–3, but which apparatus includes a modified lid designated 10A comprising an outer member 20A of opaque material and an inner member 22A formed without the guide lines and circles. The guide rings 42 and lines 44 are formed on the outer member 20A and serve the same function as described above. Except for the above-mentioned differences, the lid 10A is the same as the lid 10 and functions in the same manner as the lid 10 in forming bows.

Figure 5:
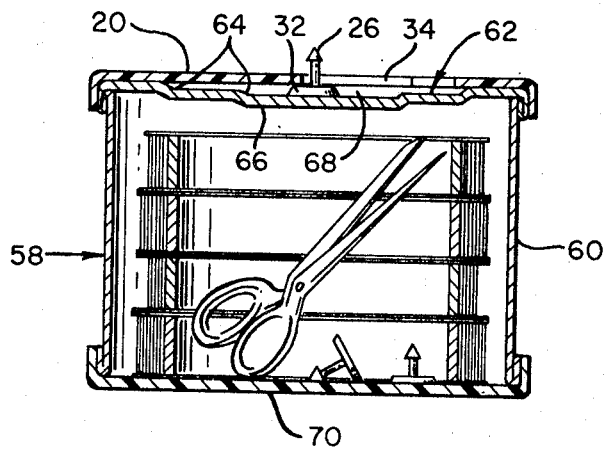
FIG. 5 is a cross-sectional view of a modified form of this invention in which the bow making apparatus is carried at the closed end of a container.

In another form of the invention, either of the lid portions 20 or 20A may be used without the inner associated lid portion 22 or 22A, respectively. Such an arrangement is illustrated in FIG. 5 to which figure reference is now made. There, a transparent lid member 20 is shown applied to the closed end of a container 58 comprising a can body 60 closed at one end by a can end 62. Can ends commonly are formed with one or more concentric rings or annular ribs 64, and a flat central portion 66 as illustrated in FIG. 5. With this arrangement a pocket 68 is formed between the lid portion 22 and can end into which pocket the flange 32 on the bow pin may be inserted through the elongated slot 34. The rings or ribs 64 formed on the can end are visible through the transparent lid section 22 and may be used as a guide in forming the loops of ribbon to desired size.

The lower end of the container 58 is closed by a removable cover 70 and the can may be used for the storage of ribbon rolls, scissors, bow pins, and the like, as illustrated and described above.

Obviously, instead of using the transparent lid portion 20 shown in FIGS. 1–3 the opaque lid portion 20A shown in 4 may be used on the can 58. The transparent lid portion 20 has the advantage of being extremely inexpensive in that no printing of guide means thereon is required. The lid portion 20 simply may comprise a conventional transparent lid, such as used on coffee cans, and the like, which has been formed with the keyhole slot 34, by any suitable means such as die cutting. Other bow pin holding means are shown and described hereinbelow.

Figure 6:
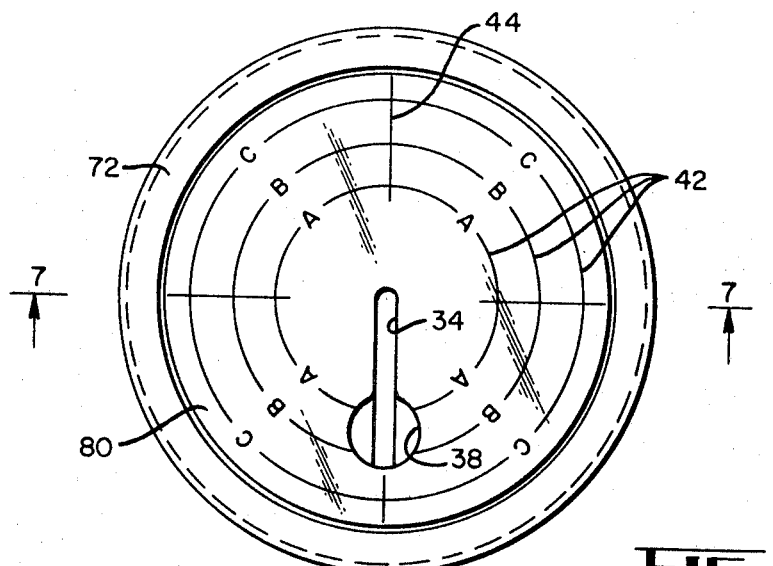
FIG. 6 is a plan view of another modified form of this invention.
Figure 7:
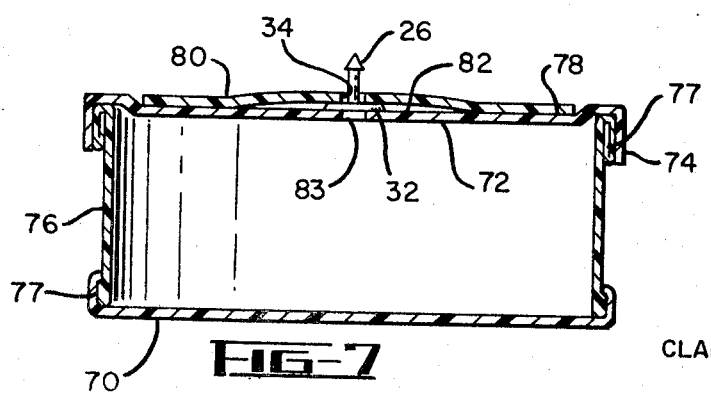
FIG. 7 is a cross-sectional view taken along line 7—7 of FIG. 6.

Another modified form of this invention is shown in FIGS. 6 and 7 to which figures reference now is made. The bow pin holding lid therein shown comprises a first plate 72 formed with an axial flange 74 for engagement with either the open or closed end of a container. In FIG. 7, the lid is shown attached to one end of a container body 76 which is open at both ends. The illustrated body is formed of plastic and has reinforcing beads 77 molded thereon at opposite ends. A removable cover 70 engages the bead at the lower end of the container body to close this end. A depression 78 is formed in the upper face of the plate 72 to receive a top plate 80 in which the elongated, keyhole-shaped slot 34 is formed and upon which the guide circles and lines 42 and 44 are located. The disc 80 is attached to the plate 72 about the periphery thereof whereby a pocket 82 is formed therebetween to receive the base of a bow pin 26. With this arrangement the container engaging flange 74 is formed on the inner plate member 72 rather than outer plate member 80. The first plate 72 is formed with an elongated slot 83, which slot underlies the slot 34 in the top plate 80. The slot 83 may be of the same length and width as the slot 34 except that it is formed without an enlarged diameter end 38. It will be understood therefore, that the base 32 of a bow pin 26 may be inserted into the pocket 82 through the enlarged diameter end 38 of the slot 34 without extending into or falling through the slot 83. The slot 83, together with the aligned keyhole slot 34 provides means whereby objects such as coins may be inserted into the container. The container, therefore, serves the additional function of a savings bank, which bank may be opened by removal of the cover 70 at the lower end, or removal of the lid from the top of the container.

In a further modification of the invention shown in FIGS. 8 and 9 another lid which is suitable for use at either the open or closed end of a container 84 is shown comprising a flat plate 86 formed with an axial flange 88 for engagement with the end of the container 84. A keyhole slot 34 to receive a bow pin 26 and guide lines 42 and 44 to guide the operator in forming an ornamental bow are included. A plate 90 is peripherally secured to the bottom of the plate 86 to provide a pocket 92 between the plates 86 and 90 at the keyhole slot 34. The plate 90 vertically supports the bow pin 26 inserted in the keyhole shaped slot 34.

In FIGS. 10 and 11 of the drawings a can lid comprising a disc 94 with a peripheral axial flange 96 is shown provided with the desired guide rings and lines 42 and 44. Centrally located on the lid is a bow pin holding device 98 comprising a bifurcated arm extending from the lid and having an outer end portion extending generally parallel with the lid at the central portion of the lid. The outer free end of the arm is formed with a slot 100 which terminates at the inner end in an enlarged diameter portion 102. The inner walls of the slot at the enlarged diameter end extend along a major portion of the circumference of the stem 28 of the bow pin 26 inserted therein. The holder may be formed as by molding on the lid, and the bow pin 26 may be inserted into the slot by sliding the same along the top of the disc 94 and into the slot. The fingers 104 of the holder have sufficient resiliency to permit insertion and removal of the bow pin in the holder.

Figure 12:
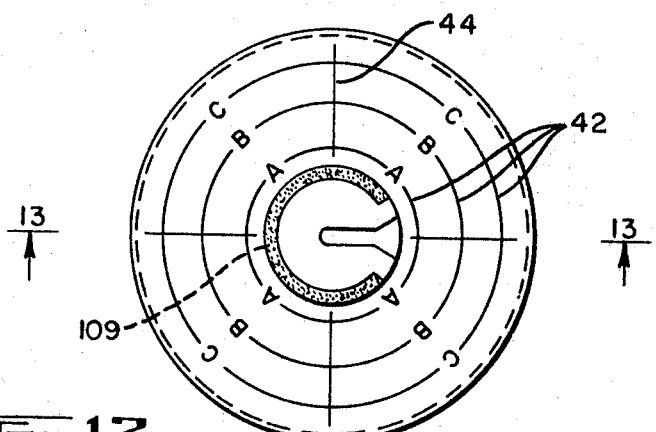
FIG. 12 is a plan view of another modified form of bow making device embodying this invention.
Figure 13:
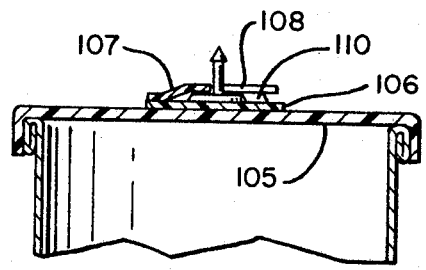
FIG. 13 is a fragmentary cross-sectional view taken on line 13—13 of FIG. 12.

In another embodiment of the invention illustrated in FIGS. 12 and 13 a lid 105 is shown having a base plate 106 secured to the center thereof as by use of a pressure-sensitive adhesive, not shown. A plate 107 having a groove 108 which extends from the edge to the center thereof is secured to the plate 106 by cementing, heat sealing or like means along a major portion of the periphery thereof as indicated at 109 in FIG. 12. A segment adjacent the slot 108 is left open whereby a pocket 110 is formed between the plates 106 and 107 for the reception of the flange 32 of the bow pin 26. The bow pin is detachably held by the holder by simply sliding the shank 28 thereof through the slot 108 to the inner end of the slot. The slot terminates adjacent the center of the lid whereby the pin is positioned at the axis of the concentric guide lines 42 when slid into position.

Figure 14:
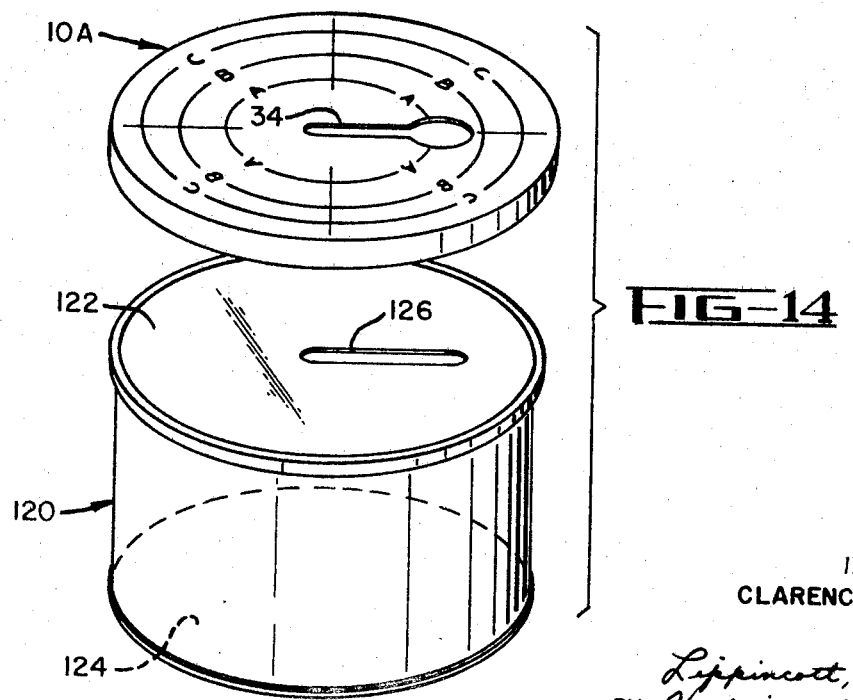
FIG. 14 is an exploded view of another modified form of this invention in which the container comprises a savings bank.

In another embodiment of the invention shown in FIG. 14, a lid such as the lid 10A shown in FIG. 4 and described above, is removably attached to the end of a can 120 closed at opposite ends by can end members 122 and 124. An off-center elongated slot 126 is formed in the one end 122 of the can, which slot underlies the slot 34 in the lid when the lid is applied to the can. A pocket is formed between the can end 110 and lid 10A when the lid is on the can in a manner similar to that shown in FIG. 5, to receive a bow pin base. With this arrangement the can 120 serves the additional function of a savings bank which may be supplied with coins through the aligned slots 34 and 126. The bank may be opened by use of a conventional can opener.

Figure 15:
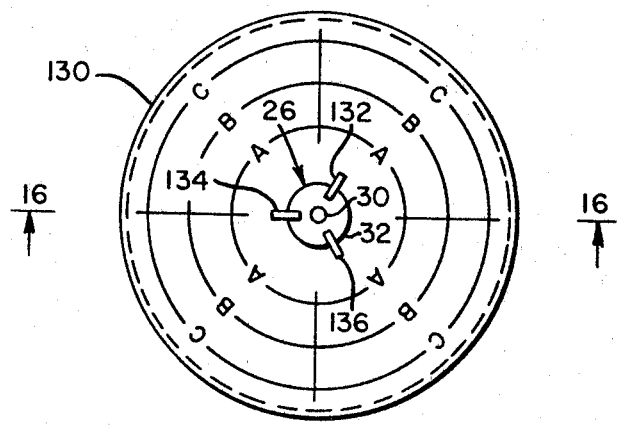
FIG. 15 is a plan view of a modified form of lid having spaced resilient fingers formed thereon for holding a bow pin, which lid embodies this invention.
Figure 16:
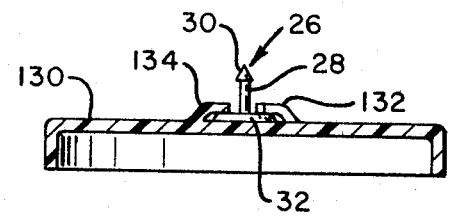
FIG. 16 is a cross-sectional view taken on line 16—16 of FIG. 15.
Figure 17:
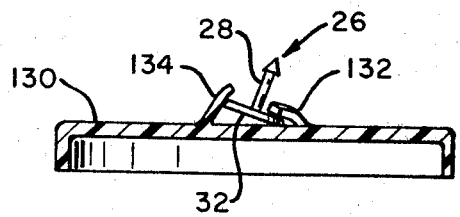
FIG. 17 is a cross-sectional view which is similar to that of FIG. 16 but showing the bow pin being removed from the holder.

Reference now is made to FIGS. 15 and 16 wherein a modified form of container lid 120 is shown which embodies this invention. In this arrangement the bow pin holding means comprises a plurality of radially spaced fingers designated 132, 134 and 136 on the upper face of the container lid. The fingers extend upwardly from the lid and then curve inwardly toward the center thereof to overlie the base portion of a bow pin 26 inserted therein. The fingers are located at the same diameter, but the arcuate distance between the fingers 132 and 136 preferably is somewhat greater than that between the fingers 132 and 134 and the fingers 132 and 136. The bow pin is inserted into the holding means by sliding the base of the pin along the cover between the fingers 132 and 136 and into position illustrated in FIGS. 15 and 16. After forming a bow on the bow pin, the bow pin may be removed from the holder by sliding the same out from between the fingers 132 and 136. Alternatively, the bow pin may be removed by grasping the shank 28 and tilting the same as illustrated in FIG. 17. The fingers 132, 134 and 136 are sufficiently flexible to permit lifting thereof by the base 32 as the bow pin is being removed. In FIG. 17 the bow pin is shown without a bow thereon for clarity. The bow pin holding fingers are integrally formed on the cover 130 by molding and are formed of the same plastic material as the cover. The cover is shown provided with the guide rings and lines 42 and 44, respectively.

Figure 18:
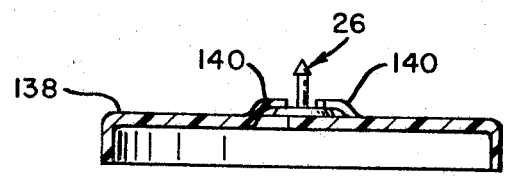
FIG. 18 is a cross-sectional view of a modified form of lid which is similar to that shown in FIGS. 15–17 but showing resilient bow pin holding fingers formed from members cut from the lid.

A lid 138 having a bow pin holding means which is similar to that shown in FIGS. 15–17 is shown in FIG. 18, to which figure reference now is made. The lid 138 is provided with three centrally located fingers 140, only two of which are shown in FIG. 18. The fingers 140 may be similar in shape and size, as the fingers 132, 134 and 136, and located in similar positions on the lid 138. In the FIG. 18 arrangement the fingers are formed by cut-out portions from the lid. Generally U-shaped slits are formed as by die cutting the lid and the fingers or tabs formed thereby are pushed upwardly into the position illustrated in FIG. 18. Insertion and removal of a bow pin from the fingers 140 is accomplished in a manner similar to that shown in FIGS. 15–17 and is not here repeated.

Figure 19:
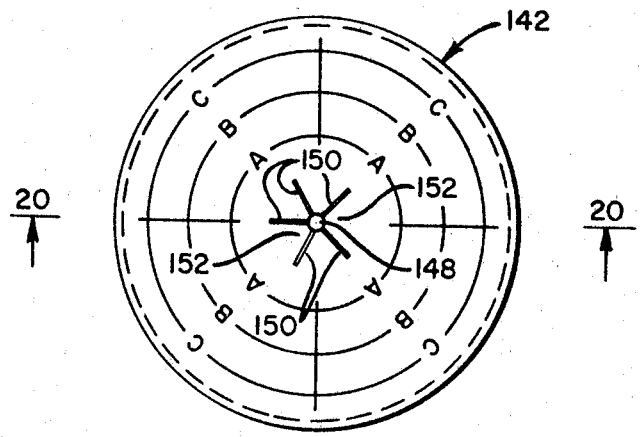
FIG. 19 is a plan view of another modified form of bow making device formed with a central aperture and a plurality of slots extending therefrom to receive a bow pin.
Figure 20:
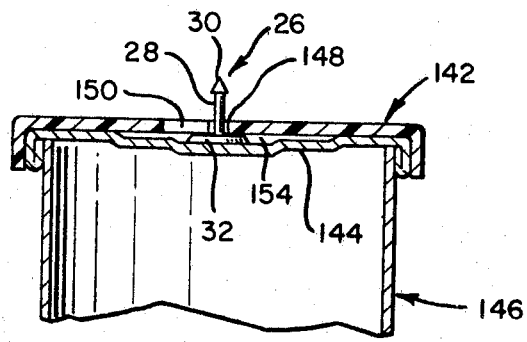
FIG. 20 is a fragmentary cross-sectional view taken on line 20—20 of FIG. 19.
Figure 21:
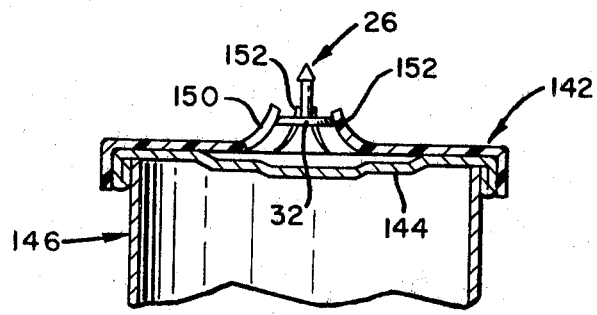
FIG. 21 is a fragmentary cross-sectional view which is similar to FIG. 20 but showing a bow pin being removed from the lid.

In a final illustrated embodiment of the invention illustrated in FIGS. 19–21 a transparent lid 42 is shown which is adapted for use at the closed end 144 of a can 146. The can end 144 is formed with rings or annular ribs which are visible through the lid. A small diameter hole 148 is formed in the center of the lid, which hole may have a diameter intermediate the diameter of the shank 28 and barb 30 of the bow pin 26. Generally radially extending slits 150 extend from the hole 148 to form resilient fingers 152 adjacent the hole. With this bow pin holding means the shank 28 of the bow pin extends through the hole 148, and the base 32 thereof is positioned in a pocket 154 formed between the lid 142 and can end 144. The bow pin may be mounted on the cover by insertion of the base 32 thereof through the hole 148 and a pair of generally diagonally opposite slits 150 by urging some fingers 152 upwardly and some downwardly to form an opening of sufficient size to accommodate the base. Alternatively, the lid 142 may first be removed from the can and the barb of the bow pin inserted through the hole 148 from the bottom of the lid, after which the lid is replaced on the can for formation of the bow.

After the bow has been formed on the bow pin, in a manner mentioned above, the bow pin with the bow formed thereon may be removed from the holding means by lifting upwardly on the bow pin 26. As seen in FIG.

21, as the bow pin is lifted the fingers 152 are urged upwardly by the base 32 of the pin, and the hole 148 increases in diameter to the full diameter of the base 32 to permit removal of the bow pin from the holder. The fingers 152 return to normal generally horizontal position illustrated in FIGS. 19 and 20 when the bow pin is removed whereby the holder is in condition to receive another bow pin in preparation for forming another bow.

Other changes and modifications may suggest themselves to those skilled in this art and it is intended that such changes and modifications shall fall within the spirit and scope of the invention as defined in the appended claims.

I claim:
1. Apparatus of the character described comprising:
    (a) a substantially cylindrical container having a lid at one end,
    (b) a resilient, plastic cover removably attached to said lid, said cover being formed with a central aperture and with radial slits extending outwardly from such aperture and forming radial fingers, said fingers being flexible and capable of displacement to enlarge such aperture to permit insertion of a bow pin and returning to normal position when released to thereby hold a bow pin so inserted with its base portion adjacent the lid and the spike projecting above the plastic cover, and
    (c) at least one of the elements (a) and (b) being formed with at least one guide circle for aiding in the production of an ornamental bow.

2. The apparatus of claim 1 wherein said guide circle is formed on the lid and the cover is transparent.

3. A bow making device of the character described comprising:
    a container such as a can or the like,
    a lid on one end of the cotnainer, said lid being formed with at least one guide circle to guide a person forming a bow,
    a transparent plastic cover removably attached to said lid and having an aperture formed therein for receiving the spike portion of a bow pin and supporting the same with its base portion on said lid and its spike portion projecting above the cover.

4. The device of claim 3 wherein said aperture is in the form of a slot and said plastic cover has a circumferential flange which fits tightly but detachably over said lid.

5. A bow making device of the character described comprising:
    a container such as a can or the like having an open end,
    a closure for such open end removably attached thereto, said closure having at least one guide circle formed thereon to guide a person in making an ornamental bow,
    said closure being imperforate whereby it serves to seal the contents of the container and being formed with bow pin holding means having a slot for receiving the bow pin and holding such pin with its spike portion projecting above the closure, such holding means being so formed as not to break the seal of the container when the closure is applied thereto.

6. A bow making device of the character described comprising:
    (a) a container,
    (b) a lid affixed to one end of said container and having a slot formed therein adapted to receive coins for depositing in the container,
    (c) a detachable cover affixed to said lid, said detachable cover having a keyhole slot formed therein and in alignment with the slot in said lid, said keyhole slot being adapted to receive a bow pin and hold it with its base portion on said lid and its spike portion projecting above the cover,
    (d) at least one of said elements (a) and (b) being formed with at least one guide circle for guiding a person in forming an ornamental bow.

References Cited

UNITED STATES PATENTS 3,193,162   7/1965   Moutoya _____ 223—46
3,194,459   7/1965   Knox _____ 223—46

MERVIN STEIN, Primary Examiner